United States Patent
Harris et al.

(10) Patent No.: US 9,447,878 B2
(45) Date of Patent: Sep. 20, 2016

(54) PISTON SEAL ASSEMBLY

(71) Applicant: Schaeffler Technologies GmbH & Co. KG, Herzogenaurach (DE)

(72) Inventors: Joshua David Harris, Copley, OH (US); Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/263,601

(22) Filed: Apr. 28, 2014

(65) Prior Publication Data

US 2014/0346737 A1    Nov. 27, 2014

Related U.S. Application Data

(60) Provisional application No. 61/827,234, filed on May 24, 2013.

(51) Int. Cl.
| | |
|---|---|
| *B60T 11/236* | (2006.01) |
| *F16J 9/20* | (2006.01) |
| *F16J 9/06* | (2006.01) |
| *F16J 9/26* | (2006.01) |
| *F16J 15/24* | (2006.01) |
| *F16J 15/56* | (2006.01) |

(52) U.S. Cl.
CPC ...... *F16J 9/20* (2013.01); *F16J 9/063* (2013.01); *F16J 9/26* (2013.01); *F16J 15/24* (2013.01); *F16J 15/56* (2013.01)

(58) Field of Classification Search
USPC ....... 277/434, 435, 436, 437, 438, 439, 451; 192/85.44, 85.54, 48.619
See application file for complete search history.

(56) References Cited

U.S. PATENT DOCUMENTS

| | | | | |
|---|---|---|---|---|
| 3,000,478 | A * | 9/1961 | Carter | 192/18 A |
| 3,650,364 | A * | 3/1972 | Laing | 192/85.32 |
| 3,837,439 | A * | 9/1974 | Piret | 188/72.6 |
| 3,844,393 | A * | 10/1974 | Zaiser | 192/48.619 |
| 3,848,518 | A * | 11/1974 | Martin | 92/107 |
| 4,082,171 | A * | 4/1978 | Lalin et al. | 192/70.2 |
| 4,225,026 | A * | 9/1980 | Yamamori et al. | 192/70.2 |
| 4,450,944 | A * | 5/1984 | Fujioka et al. | 192/70.12 |
| 4,724,941 | A * | 2/1988 | Wirkner | 192/52.2 |
| 4,753,136 | A * | 6/1988 | Hayakawa et al. | 475/146 |
| 5,701,976 | A * | 12/1997 | Kumagai et al. | 188/71.5 |
| 6,752,252 | B2 * | 6/2004 | Ichikawa | 192/85.41 |
| 7,063,197 | B2 * | 6/2006 | Merkel et al. | 192/85.24 |
| 7,140,481 | B2 * | 11/2006 | Hagenow | 192/85.42 |
| 8,162,116 | B2 * | 4/2012 | Nohl et al. | 192/48.619 |
| 8,403,120 | B2 * | 3/2013 | Voegtle et al. | 192/48.611 |
| 8,523,188 | B2 * | 9/2013 | Zaugg | F16J 15/441 277/422 |

(Continued)

FOREIGN PATENT DOCUMENTS

JP        2002235857 A        8/2002

*Primary Examiner* — Kristina Fulton
*Assistant Examiner* — Eugene G Byrd
(74) *Attorney, Agent, or Firm* — Volpe and Koenig, P.C.

(57) ABSTRACT

A piston seal assembly including a piston, plate, and seal is provided. The piston is slidably supported on a shaft or in a housing, and includes a recess on an inner or outer radial portion. The plate is fastened to the piston and extends at least partially adjacent to the recess. The seal is located at least partially within the recess of the piston. The seal includes a radial sealing surface that engages the shaft or the housing, and the seal is axially movable between the piston and the plate via hydraulic fluid pressure.

13 Claims, 3 Drawing Sheets

(56) References Cited

U.S. PATENT DOCUMENTS

| | | | |
|---|---|---|---|
| 8,607,948 B2* | 12/2013 | Sturgin et al. | 192/3.25 |
| 8,839,929 B2* | 9/2014 | Kato et al. | 192/48.619 |
| 2003/0010202 A1 | 1/2003 | Norheim | |
| 2003/0146581 A1 | 8/2003 | Beck | |
| 2008/0271968 A1* | 11/2008 | Metzinger et al. | 192/48.8 |
| 2008/0277228 A1* | 11/2008 | George | 192/48.1 |
| 2009/0260516 A1 | 10/2009 | Fukui et al. | |
| 2012/0161400 A1 | 6/2012 | George | |
| 2012/0186443 A1 | 7/2012 | George | |
| 2014/0346737 A1* | 11/2014 | Harris et al. | 277/434 |

* cited by examiner

PISTON SEAL ASSEMBLY

INCORPORATION BY REFERENCE

The following documents are incorporated herein by reference as if fully set forth: U.S. Provisional Application No.: 61/827,234, filed May 24, 2013.

FIELD OF INVENTION

This application is generally related to a clutch assembly and more particularly related to a piston seal for a clutch assembly.

BACKGROUND

Clutch assemblies and piston seal assemblies for use in automotive transmissions are well known. Known piston seal assemblies are disclosed in U.S. Patent Application No. 2012/0161400, which is incorporated by reference herein as if fully set forth. The known assemblies generally include a disc-shaped piston, a retaining plate, and seal. The piston moves in the axial direction along a housing or a shaft via hydraulic fluid pressure, and the seal is designed to prevent leakage of the hydraulic fluid during movement in one direction, and is allowed to axially shift during movement in the opposite direction to allow flow of the hydraulic fluid past the seal. However, in these prior known arrangements, applicants have discovered that the seal can fail due to extrusion into a gap between the piston and the plate, and cause the piston seal assembly to malfunction.

SUMMARY

It would be desirable to provide a more reliable piston seal assembly to extend the life of the assembly and prevent malfunctions.

A piston seal assembly including a piston, plate, and seal is provided. The piston is slidably supported on a shaft or in a housing, and includes a recess on an inner or outer radial portion. The plate is fastened to the piston and extends at least partially adjacent to the recess. The seal is located at least partially within the recess of the piston. The seal includes a radial sealing surface that engages the shaft or the housing, and the seal is axially movable between the piston and the plate via hydraulic fluid pressure.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
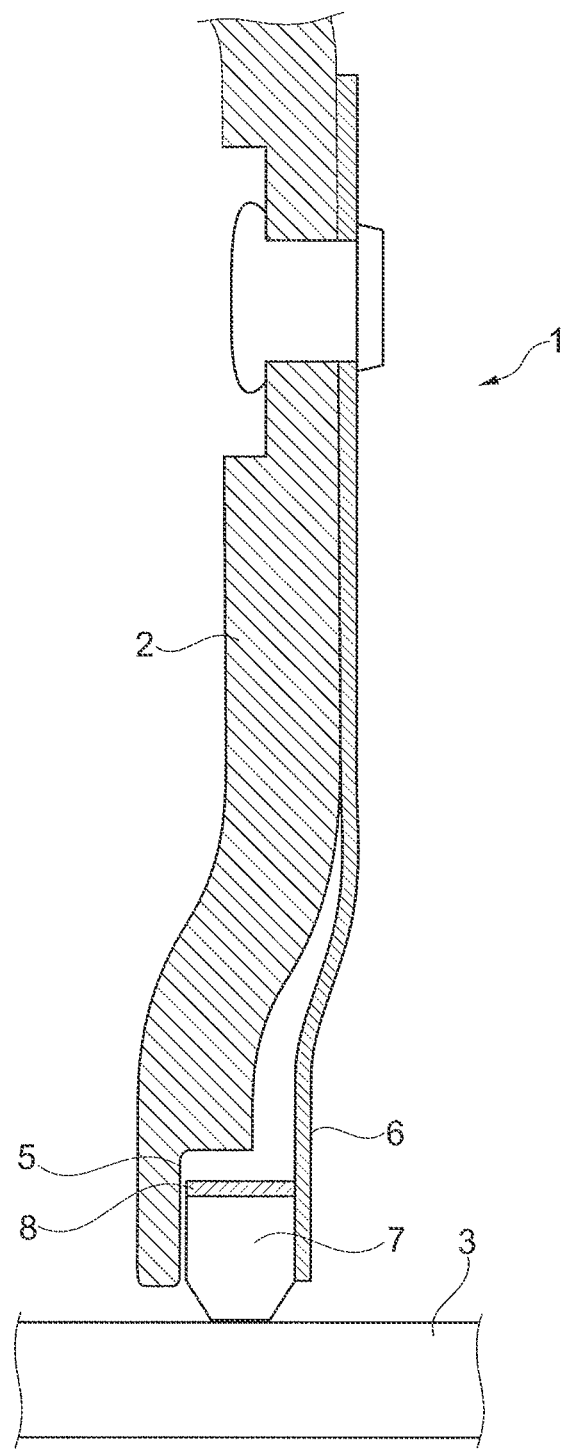
FIG. 1 is a cross-sectional partial view of a preferred embodiment of a piston seal assembly according to the invention in which a seal engages a central shaft.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
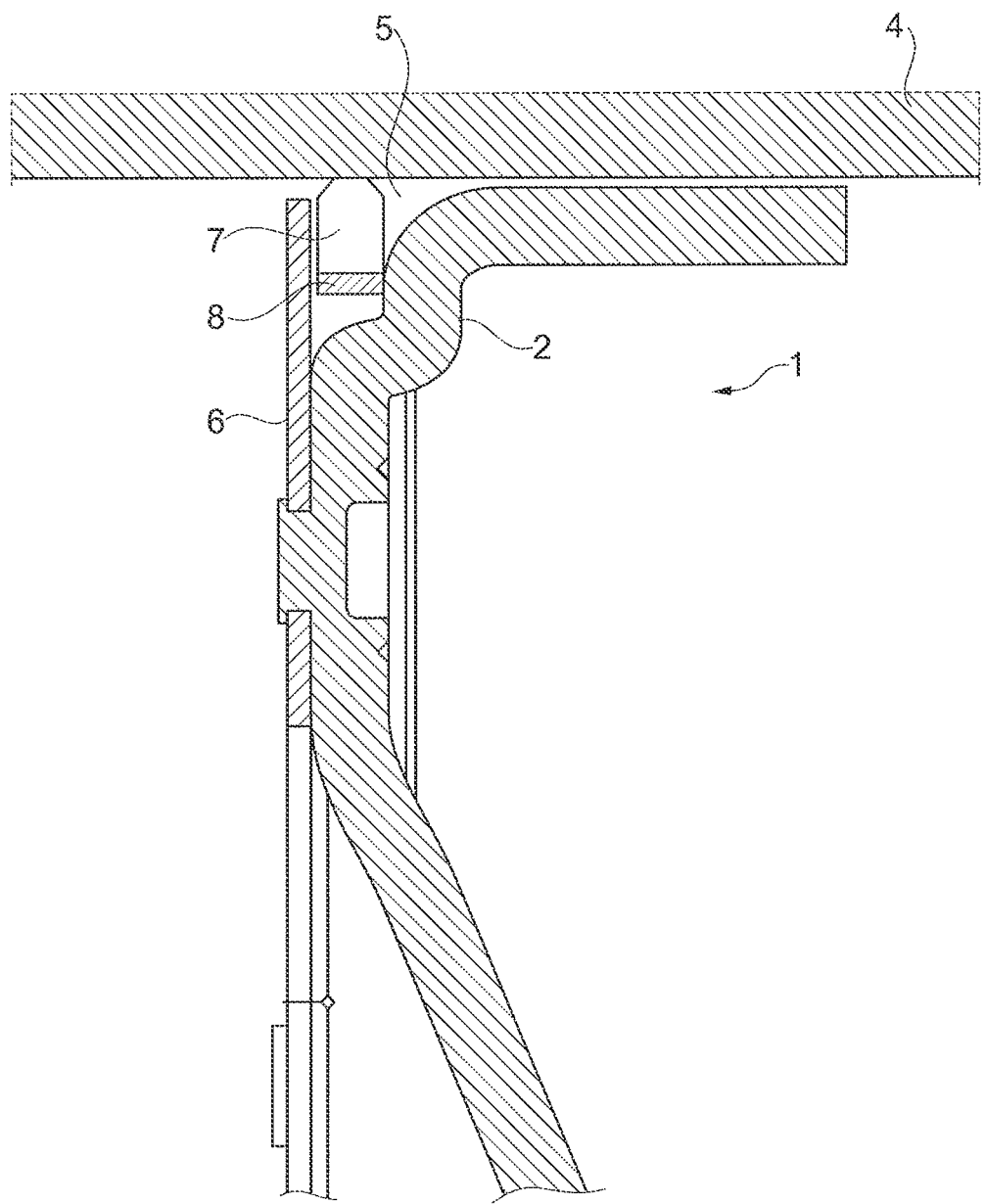
FIG. 2 is a cross-sectional partial view of another preferred embodiment of the piston seal assembly according to the invention in which the seal engages a housing.

FIGS. 1 and 2 show half-views of a piston seal assembly 1 according to the present invention. The piston seal assembly 1 includes a preferably disc-shaped piston 2 that is slidably supported on a shaft 3 or in a housing 4. The piston 2 includes a recess 5 on an inner or outer radial portion depending on whether the seal assembly is for creating a seal with the shaft 3 or the housing 4. A plate 6 is fastened to the piston 2 and extends at least partially adjacent to the recess 5. The plate 6 is preferably fastened to the piston 2 via fasteners, such as a rivet, or a nut and bolt, or any other suitable fasteners. The recess 5 on the inner or outer radial portion of the piston 2 partially defines a gap between axial end surfaces of the piston 2 and the plate 6.

A seal 7 is located at least partially within the recess 5 of the piston 2 and in the gap between the axial end surfaces of the piston 2 and the plate 6. The seal 7 includes a radial surface that engages the shaft 3 (FIG. 1) or the housing 4 (FIG. 2), depending on the orientation of the piston seal assembly 1, and the seal 7 is axially movable between the piston 2 and the plate 6 via hydraulic fluid pressure. The seal 7 is engaged with the shaft 3 or the housing 4 via an interference fit. A radially inner or outer portion of the piston 2 is preferably axially offset from a body portion of the piston 2 to create an axially constrained seal movement path in the axial space between the plate 6 and the body portion of the piston 2. When high pressure is applied to the piston 2, the piston 2 presses against the seal 7 and the gap is located between the plate 6 and the seal 7. When high pressure is applied to the plate 6, the plate 6 presses against the seal 7 and the gap is located between the piston 2 and the seal 7.

The seal 7 is preferably a rubber or polymeric material. The seal 7 is more preferably 35% glass fiber filled polytetrafluoroethylene (PTFE). The seal 7 can include chamfered edges along the inner or outer radial surface. As shown in FIG. 1, if the recess 5 is on the inner radial portion of the piston 2, then an inner radial portion of the seal 7 engages the shaft 3. As shown in FIG. 2, if the recess 5 is on the outer radial portion of the piston 2, then an outer radial portion of the seal 7 engages the housing 4. The seal 7 is preferably wider than the recess 5. Alternatively, the seal 7 can be thinner than the recess 5 and not include chamfered edges.

A jacket 8 is located along a radial surface of the seal 7 opposite from the radial sealing surface of the seal 7, i.e. the radial surface that engages the shaft 3 or the housing 4. The jacket 8 can be assembled with an interference fit to the seal 7. The jacket 8 constrains radial deformation of the seal 7 to prevent the seal 7 from extruding into the gap located between piston 2 and the plate 6 of the piston seal assembly 1. The jacket 8 also constrains axial deformation of the seal 7 which can occur when the seal 7 is axially pressed against the piston 2 or the plate 6. The jacket 8 is preferably SAE 1008-1012 steel. The jacket 8 is preferably 0.5 mm thick. However, those skilled in the art will recognize that other materials and thicknesses could be used. Preferably, the seal 7 is bonded, adhered, or otherwise connected to the jacket 8 so that they form a unitary part.

In use, hydraulic fluid pressure builds up one side of the piston seal assembly 1, and the seal 7 is axially moved along the shaft 3 or the housing 4 to create a seal against the piston 2 or the plate 6. When hydraulic fluid pressure is applied in an opposite direction, hydraulic fluid can leak around the piston 2 through an opening between the piston 2 and the shaft 3 or housing 4. In this direction, the hydraulic fluid urges the seal 7 against the plate 6 and the hydraulic fluid flows between an opening between the seal 7 and the piston 2. The seal 7 can be rotationally fixed with the piston 2 or the plate 6 when the seal 7 is axially pressed against the piston 2 or the plate 6 via the hydraulic pressure.

Figure 3:
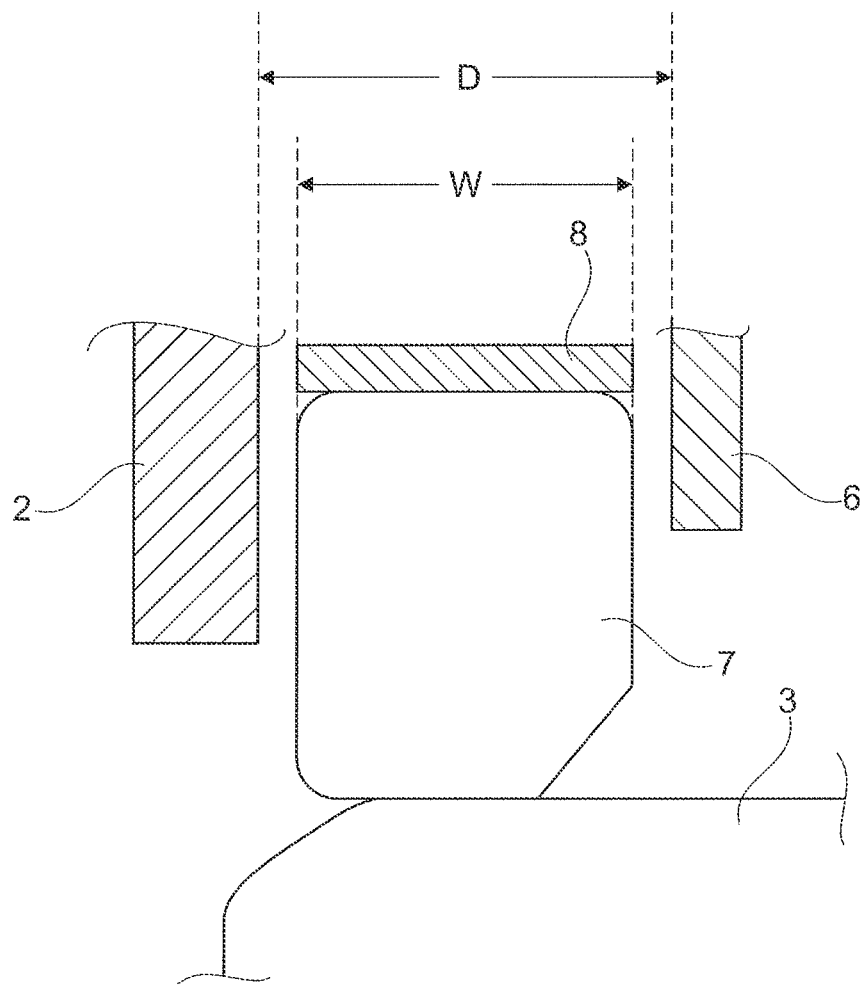
FIG. 3 is a magnified view of a piston seal assembly according to the invention in which the seal engages the housing.

FIG. 3 is a magnified view of a piston seal assembly 1 according to the present invention. FIG. 3 shows a distance (D) is defined between the piston 2 and the plate 6. The distance (D) is preferably in the range of 3.5-4.5 mm, and is more preferably in the range of 3.7-4.1 mm. The seal 7 has a width (W) that is preferably in the range of 3-4 mm, and is more preferably in the range of 3.4-3.8 mm. The difference between the distance (D) between the piston 2 and the plate 6, and the width (W) of the seal 7 is preferably in the range of 0.4-0.7 mm, and is more preferably 0.55 mm. If the difference between the distance (D) between the piston 2 and the plate 6, and the width (W) of the seal 7 is increased, then the piston seal assembly 1 can experience a sudden increase in pressure during operation due to axial movement of the seal 7 between the piston 2 and the plate 6. Likewise, if the distance (D) between the piston 2 and the plate 6 is increased and the seal 7 width (W) is held constant, the range of potential axial movement of the seal 7 is increased, which can cause a sudden increase in pressure if the seal 7 slips during axial movement between the piston 2 and the plate 6. The jacket 8 allows the distance (D) between the piston 2 and the plate 6 to be reduced while ensuring that the seal 7 does not become axially compressed between the piston 2 and the plate 6.

Having thus described various embodiments of the present piston seal assembly in detail, it will be appreciated and apparent to those skilled in the art that many changes, only a few of which are exemplified in the detailed description above, could be made in the piston seal assembly according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

REFERENCE NUMBERS

1 Piston Seal Assembly
2 Piston
3 Shaft
4 Housing
5 Recess
6 Plate
7 Seal
8 Jacket

What is claimed is:

1. A piston seal assembly, comprising:
   a piston slidably supported on a shaft, the piston including a recess on an inner radial portion;
   a plate fastened to the piston that extends at least partially adjacent to the recess; and
   a seal located at least partially within the recess of the piston, the seal including a radial sealing surface that engages the shaft, and the seal is axially movable between the piston and the plate via hydraulic fluid pressure;
   wherein an axial width of a portion of the seal located axially between the piston and the plate is greater than an axial width of the recess of the piston.

2. The piston seal assembly of claim 1, further comprising a jacket located along a radial surface of the seal opposite the radial sealing surface that engages the shaft, and the jacket constrains deformation of the seal.

3. The piston seal assembly of claim 2, wherein a radially inner portion of the piston is axially offset from a body portion of the piston to create an axially constrained seal movement path in an axial space between the piston and the plate, and the jacket prevents seal extrusion into the axial space.

4. The piston seal assembly of claim 2, wherein the jacket is SAE 1008-1012 steel.

5. The piston seal assembly of claim 1, wherein the recess is on the inner radial portion of the piston and an inner radial portion of the seal engages the shaft.

6. The piston seal assembly of claim 1, wherein the seal includes chamfered edges along the inner radial surface.

7. The piston seal assembly of claim 1, wherein the seal comprises a rubber or polymeric material.

8. The piston seal assembly of claim 1, wherein fasteners secure the piston to the plate.

9. A piston seal assembly, comprising:
   a piston slidably supported against a counter-surface, the piston including a recess on an outer radial portion;
   a plate fastened to the piston that extends at least partially adjacent to the recess; and
   a seal located at least partially within the recess of the piston, the seal including a radial sealing surface that engages the counter-surface, and the seal is axially movable between the piston and the plate via hydraulic fluid pressure;
   wherein an axial width of a portion of the seal located axially between the piston and the plate is greater than an axial width of the recess of the piston.

10. The piston seal assembly of claim 9, further comprising a jacket located along a radial surface of the seal opposite the radial sealing surface that engages the counter-surface, and the jacket constrains deformation of the seal.

11. The piston seal assembly of claim 10, wherein a radially outer portion of the piston is axially offset from a body portion of the piston to create an axially constrained seal movement path in an axial space between the piston and the plate, and the jacket prevents seal extrusion into the axial space.

12. The piston seal assembly of claim 9, wherein the recess is on the outer radial portion of the piston and an outer radial portion of the seal engages the counter-surface.

13. The piston seal assembly of claim 9, wherein the seal includes chamfered edges along the outer radial surface.

* * * * *